United States Patent [19]

Williams

[11] Patent Number: 4,670,703

[45] Date of Patent: Jun. 2, 1987

[54] BATTERY CHARGER WITH THREE DIFFERENT CHARGING RATES

[75] Inventor: James W. Williams, Lynchburg, Va.

[73] Assignee: General Electric Company, Lynchburg, Va.

[21] Appl. No.: 730,933

[22] Filed: May 6, 1985

[51] Int. Cl.[4] .............................................. H02J 7/00
[52] U.S. Cl. ...................................... 320/22; 320/15; 320/21; 320/31; 320/39; 320/48
[58] Field of Search ...................... 320/22, 24, 15, 21, 320/39, 48, 30, 31

[56] References Cited

U.S. PATENT DOCUMENTS

| | | | |
|---|---|---|---|
| 3,193,750 | 7/1965 | Chait | 320/22 |
| 3,281,651 | 10/1966 | Contino et al. | 323/16 |
| 3,553,561 | 1/1971 | Lesher | 320/22 |
| 3,599,071 | 8/1971 | Lapuyade et al. | 320/35 |
| 3,603,862 | 9/1971 | Chase et al. | 320/39 |
| 3,624,481 | 11/1971 | Macharg | 320/39 |
| 3,660,748 | 5/1972 | Clayton | 320/39 |
| 3,700,997 | 10/1972 | Smith | 320/20 |
| 3,767,994 | 10/1973 | Dittmar et al. | 320/20 |
| 3,835,368 | 9/1974 | Williams | 323/17 |
| 3,855,516 | 12/1974 | Fairchild | 320/22 |
| 3,863,129 | 1/1975 | Yamauchi | 320/31 |
| 3,867,681 | 2/1975 | Bishop et al. | 320/21 |
| 3,911,349 | 10/1975 | Seeley et al. | 320/20 |
| 4,061,956 | 12/1977 | Brown et al. | 320/22 |
| 4,134,056 | 1/1979 | Fukui et al. | 320/20 |
| 4,211,478 | 7/1980 | Huber et al. | 320/48 X |
| 4,247,811 | 1/1981 | Findl | 320/48 X |
| 4,290,002 | 9/1981 | Piotti | 320/20 |
| 4,386,308 | 5/1983 | Emile, Jr. et al. | 320/22 |
| 4,394,611 | 7/1983 | Fallon et al. | 320/21 |
| 4,433,277 | 2/1984 | Carollo | 320/15 X |
| 4,468,605 | 8/1984 | Fitzgerald et al. | 320/36 |

Primary Examiner—Patrick R. Salce
Assistant Examiner—Anita M. Ault
Attorney, Agent, or Firm—Nixon & Vanderhye

[57] ABSTRACT

A circuit for safely and rapidly charging batteries, with the charging occurring at three different rates. A first rate is used to bring a battery up to a level where it is determined to be safe for rapid rate charging. At this charge level the temperature of the battery may also be checked to be sure it is within a safe range for rapid charging. If safe, the battery is then rapidly charged at a second rate, until it is almost at its maximum capacity. At that point a third rate charge, lower than the first charge rate, is used to maintain the battery at nominally full charge. A microprocessor controller controls a plurality of rapid rate chargers and determines when the battery parameters are safe so that rapid charging can be safely employed. The rapid charger may be of a conventional charge pump type.

14 Claims, 8 Drawing Figures

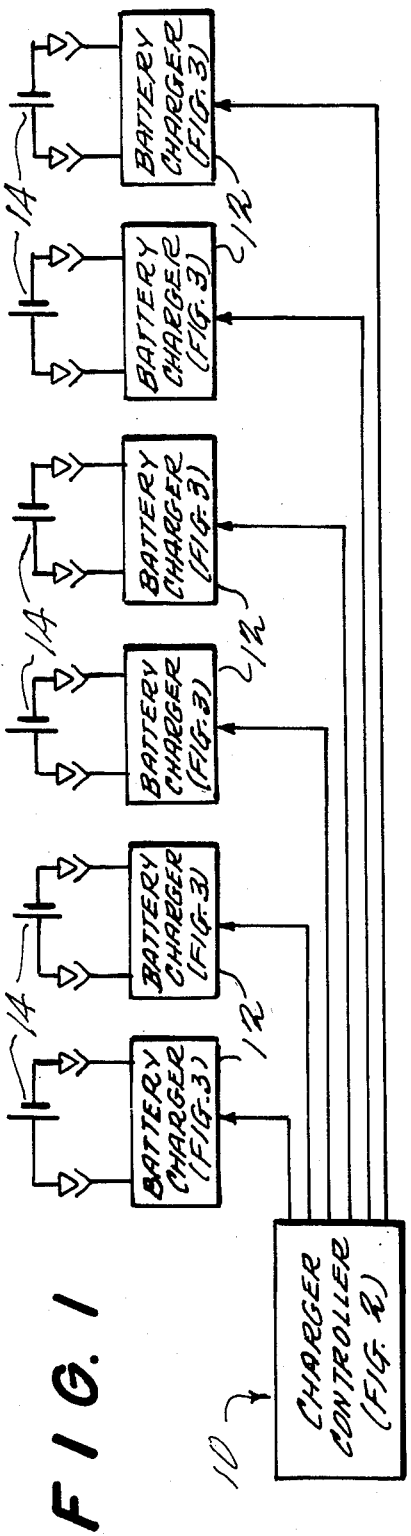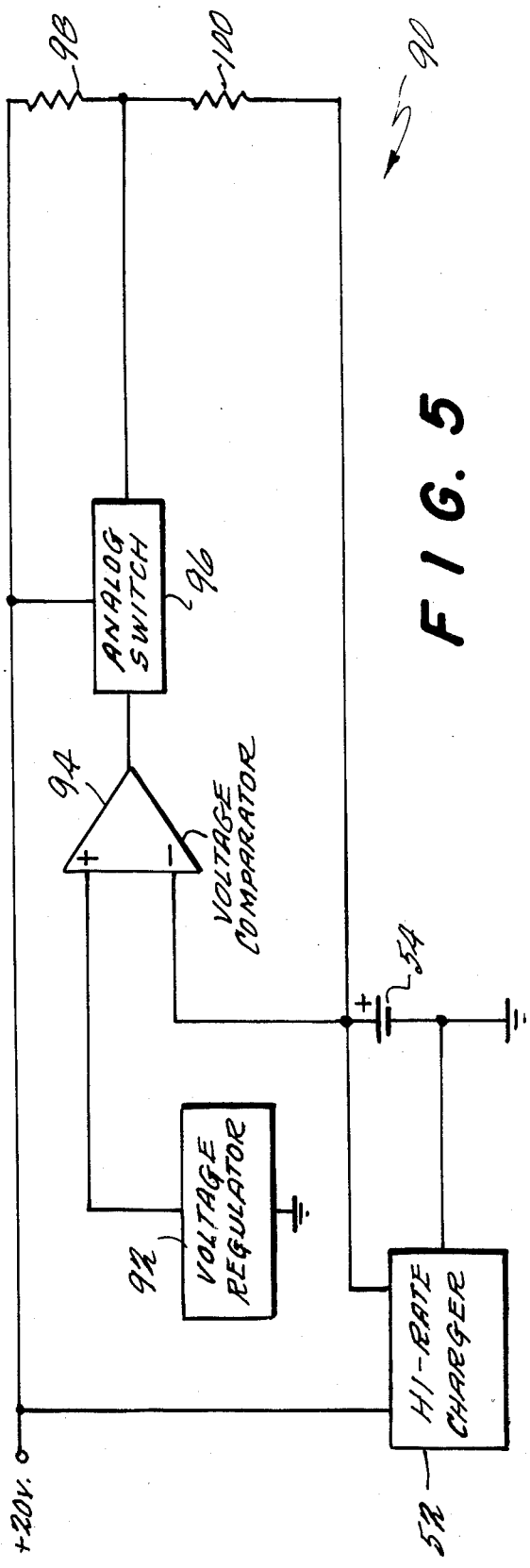

BATTERY CHARGER WITH THREE DIFFERENT CHARGING RATES

BACKGROUND OF THE INVENTION

This invention relates to a battery charger having three different charging rates. A first "trickle" charge rate is used, if needed, to bring the battery up to a predetermined minimum charge capacity without overheating. Once the battery has reached this minimum charge level without overheating, it is presumed safe to use a high rate charger on the battery so as to minimize the overall charging time of the battery. This high rate charge must be terminated as the battery reaches full charge, due to known dangers of high rate charging on a fully charged battery. To bring the battery up to and/or to maintain its full charge, a lower "tickle" charge rate is employed. During the time the battery is rapid charging, this battery charger continually checks certain parameters of the battery to be sure that it is still within safe ranges for high rate charging.

Batteries store energy in chemical form. When a load is placed across the battery, a chemical reaction within the battery produces the required electric current. A normal battery of "throw away" type has chemicals which react to produce electricity, but are generally not subsequently reusable. Rechargeable batteries, on the other hand, contain chemicals which can undergo reversible reactions, that is to say undergo a reaction in one direction to produce electricity, and upon application of an electric charge to the battery, undergo a chemical reaction in the reverse direction thus storing the energy for later use.

There are many popular kinds of rechargeable batteries. The most popular presently are the nickel cadmium and lead acid types. The battery charger disclosed in the present invention is optimized for use with a nickel cadmium type battery.

Nickel cadmium batteries suffer from many problems during charging. It is extremely unsafe to overcharge a nickel cadmium battery as this can result in severe internal damage to the battery or even explosion. By applying too much charge to a battery that is already fully charged, the energy is dissipated by a temperature rise which leads to a phenomenon known as "gassing". This gassing is produced by chemicals within the battery absorbing the energy applied and thus changing into a gaseous state. Since a nickel cadmium battery is typically hermetically sealed, this production of gas can lead to pressure within the battery which, in extreme cases, could result in explosion. Gassing can also result from attempting to charge a battery that is at too high or too low a temperature. Another problem that can be encountered during charging is that when a battery gets to a certain temperature during normal charging it can lead to a condition known as "thermal runaway", wherein a majority of the energy being applied to the battery results in a temperature increase.

It also is desirable to charge a battery as rapidly as possible. However, the higher charge rates make the above mentioned effects more likely to occur. In the prior art this tradeoff was often accommodated by providing a two rate charger. In general, a medium rate charge was applied to bring a battery nearly up to its nominal voltage. At that point, the rate would be changed to a very low rate which was intended to bring the battery up to full charge and to keep it fully charged.

One such two rate charger is described in U.S. Pat. No. 3,553,561 to Lesher. Lesher describes a two rate charger for use within an emergency lighting system wherein a high rate charge is used to bring the battery up to a cutoff point just below the gasing point of the battery, and a charge of relatively low current thereafter is used to maintain the battery at this charge.

U.S. Pat. No. 3,624,481 to Macharg also describes a two rate charger for nickel cadmium batteries which tests battery voltage against a reference voltage to determine when the current rate should be altered. U.S. Pat. No. 4,386,308 to Emile, Jr. et al teaches a two rate battery charger wherein hysteresis is used to prevent undue oscillating between different rate charges at the switching point. U.S. Pat. No. 3,855,516 to Fairchild discloses a battery charger which charges at a high rate for a predetermined time period after which a trickle level is initiated. Other similar chargers are disclosed in U.S. Pat. No. 3,603,862 to Chase et al, U.S. Pat. No. 3,660,748 to Clayton et al, U.S. Pat. No. 4,134,056 to Fukui et al, and U.S. Pat. No. 3,863,129 to Yamauchi et al.

An example of a fast charger for a nickel cadmium battery is already described in U.S. Pat. No. 4,468,605 to Fitzgerald et al. This battery charging device also monitors battery temperature and voltage to determine the safety of applying a high rate charge to the battery. However, even Fitzgerald teaches only a two rate battery charger. Instead of initially slowly charging the battery to a voltage at which it is safe to apply a high rate charge, Fitzgerald pulses the battery at a low duty cycle with a high rate charge, and determines the approximate first derivative of battery voltage during this charging period. Using a complicated algorithm, this battery charger then determines whether the battery is in a safe operating region to be high rate charged. If the battery is in such a safe region, a high rate charging cycle begins. When a certain voltage has been reached the high rate charging cycle is terminated and a trickle charge begins. The disclosure of Fitzgerald et al is hereby expressly incorporated herein by reference.

Conspicuously absent from all of these prior art documents is any suggestion of using a third charging level as now disclosed in this application.

A problem existing even in prior two-rate chargers is that a battery can not safely be rapid charged if it is in sufficiently poor condition (e.g., extremely low open circuit voltage, lack of continuity, etc.). The problems and dangers discussed above could have extreme consequences if an extremely high charge were used during the time these poor conditions persist. Thus, devices in the prior art typically used only an intermediate charging rate as the "high" charge rate.

Another problem with prior two-rate chargers is that, in reality, a somewhat higher rate often is needed initially to bring the battery up to a safe voltage for rapid charge than is needed merely to sustain battery charge once the high rate charging is complete. Thus, a two rate charger typically employs compromise charge rates between the optimal rates. However, with such a compromise, a severly discharged battery might never be brought to safe conditions for applying rapid rate by this less than optimal initial rate of charge—and once the battery is fully charged, any higher than necessary charging current will dissipate its energy in the form of heat. As discussed above, heating of these batteries can lead to serious side effects, and also shortens the battery's life, and makes it more subject to failure.

The present invention initiates battery charging at a medium range rate ("trickle"), while it is charged to a predetermined voltage. The purpose of this initial medium range charge is to insure safe conditions before applying a truly "high" charge rate, by test of the battery's condition. During this initial period, the temperature of the battery is also continually being monitored by a microprocessor controller. When the battery reaches a certain voltage without excessive overheating, it will be presumed safe to apply a rapid "high" charge to the battery. This rapid charge will be applied to the battery until such time as the battery reaches a voltage very close to its nominal capacity. At this time, a third charging rate is applied, a very low "tickle" charge.

Other objects, features, and advantages of the present invention will become more apparent upon consideration of the following detailed description with reference to the accompanying drawings, all of which form a part of this specification, wherein like reference numerals designate corresponding parts in the various figures.

BRIEF DESCRIPTION OF THE DRAWINGS

FIG. 1 is a general block diagram of a charging system having a charger controller controlling six discrete battery chargers;

FIG. 5 schematically depicts a second exemplary embodiment of the trickle/tickle charger of this invention;

DETAILED DESCRIPTION OF THE PREFERRED EXEMPLARY EMBODIMENT

FIG. 1 depicts a block diagram of a battery charger system which may be realized using the present invention. A charger controller 10 monitors the voltage and temperatures of plural batteries and determines when rapid charging can be safely employed. The charger controller supervises the operation of a plurality of battery chargers 12. In this embodiment, controller 10 controls six such chargers. Each charger may be connected to charge a battery 14. Battery charger 12 charges each battery 14 to its nominal voltage under partial supervision of charger controller 10.

Figure 2:
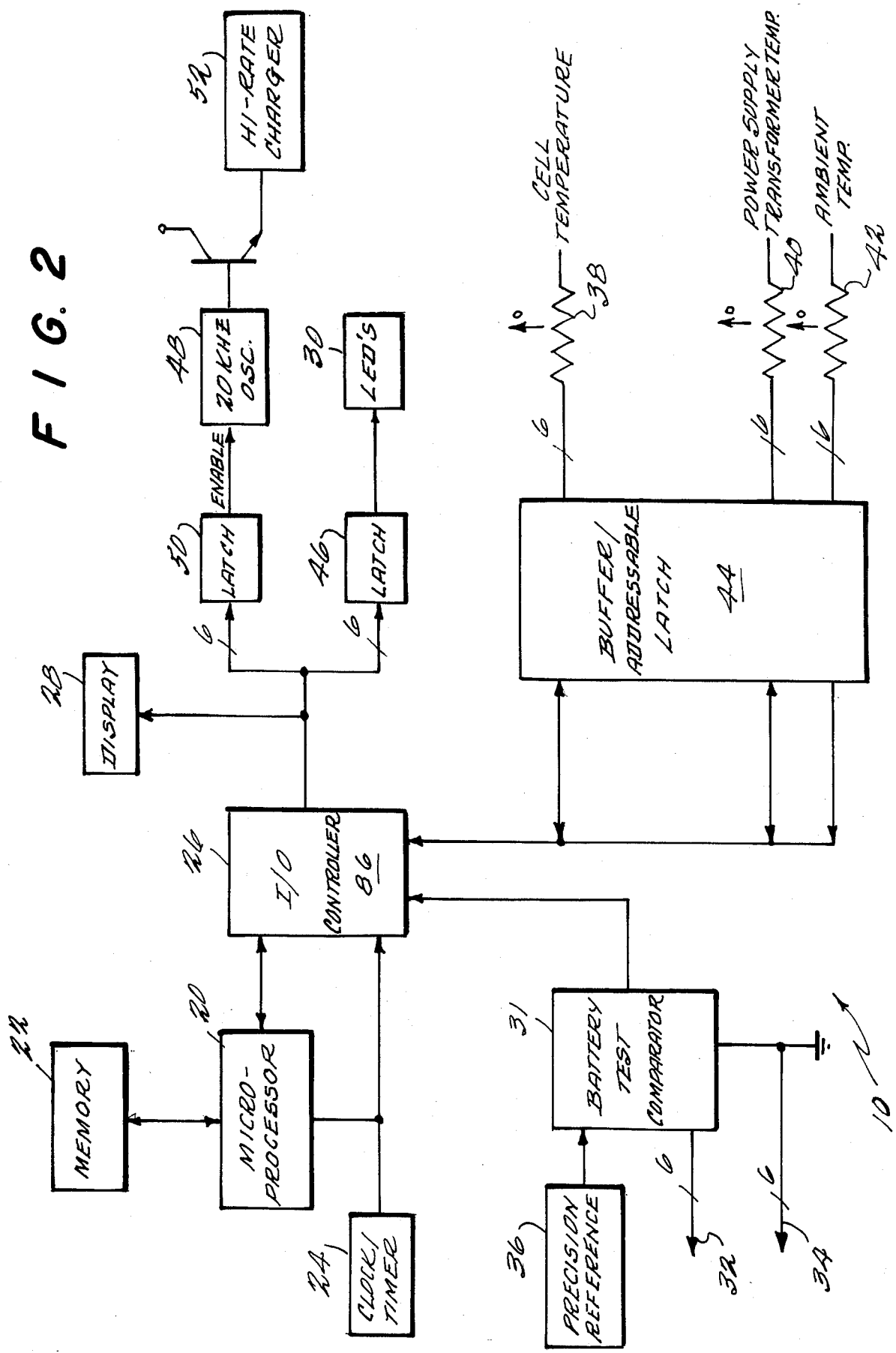
FIG. 2 is a more detailed block diagram of the charger controller shown in FIG. 1.

As shown in FIG. 2, the main decision making component of charger controller 10 is microprocessor control circuit of substantially conventional architecture. Associated with microprocessor 20 is a program memory 22. Microprocessor 20 may be a Rockwell 6505, and the processor memory may include a masked ROM, and a RAM. Microprocessor 20 also typically receives input from clock/timer 24 and is conventionally buffered with respect to its interfaces with other systems by I/O controller 26 which, in turn, communicates with the display 28, with a bank of LEDs 30, containing one LED for each charger in the system, and with a plurality of devices which relate information on the system parameters to the microprocessor.

One such parameter being continually monitored is the battery voltage. A battery test comparator 31 compares the battery voltage (obtained at points 32 and 34) with a precision reference voltage 36. Based on a predetermined control program (which is discussed with reference to FIG. 8, infra), when the battery is within a certain voltage range, the microprocessor will make the decision that this particular parameter is safe for rapid charge operation. A flow chart of a control program which can be used is discussed with reference to FIG. 8.

Also continually monitored is the battery temperature. The temperature measuring means, in this embodiment is a thermistor 38 (e.g., one of which is arranged to be in thermal contact with each battery being charged). The cell temperature is monitored by microprocessor 20 for an additional decision parameter as to the safety of rapid charging. If cell temperature gets too hot, it can indicate that the battery is overcharging. This is because when a battery is fully charged, all further charge applied to it turns into heat rather than being stored as chemical energy. In this embodiment, microprocessor 20 will terminate rapid charge sequence if the cell temperature warms to 10° C. above ambient temperature.

Microprocessor 20 uses its control over the rapid charging system to ensure that it obtains a more accurate sample of the voltage than available in prior art rapid charging systems. For a window of approximately 10 milliseconds in every 1-2 second period, microprocessor 20 terminates rapid charging (if it is then being applied), and at the same time obtains a sample of the voltage on the battery. During these samples, there will only be a 35 milliamp "tickle" charge being applied to the battery—which is fairly close to the desired open circuit test condition. In the prior art, battery voltage is tested while either the rapid charger or other rate (higher than the present "tickle" rate due to the tendency of this other rate to be compromise rate as described, infra) charger is still operating. This charging tends to artificially stretch the battery voltage upwards, thus terminating the rapid charge sequence prematurely and not allowing the battery to reach its full charge capacity as desired.

Microprocessor 20 also controls the LED bank 30 in response to temperature of the battery. If the temperature of the battery gets too high during charging (10° C. over ambient), microprocessor 20 causes one of the LED's in LED bank 30 to light, thus indicating to the user that the battery corresponding to the lit LED is over-heating. If the battery being charged is too cold for full charging, the LED in bank 30 corresponding to that battery will be caused to flash.

Also, if a battery is too cold, the chemicals in the battery may be relatively unreactive and thus resistant to quickly reacting to a rapid charge. This could also result in undesirable effects. Thus, if the thermistor 38 detects a battery that is too cold, a full rapid charge will not be applied to the unit. In this embodiment, if the battery temperature is less than 5° C. there will be no charge applied to it. If it is greater than 5° C. but less than 10° C. it will receive a charge at 25% duty cycle.

From 10° to 15° C. the battery will be charged at 50% duty cycle, and from 15° to 20° C. the battery will be charged at a 75% duty cycle. Any temperature above 20° C. is deemed allowable for the battery to be charged at full rapid charge.

Another system parameter which is monitored is the temperature of the power supply transformer, which is monitored by another temperature measurement means, thermistor 40. A power supply overheat causes suspension of the rapid charge sequence in this embodiment. Thermistor 42 monitors the ambient temperature to provide the necessary data to microprocessor 20 as to the temperature rise of the battery and transformer. Information from thermistors 38, 40 and 42 are level shifted and buffered by addressable latch 44 before being applied to I/O controller 26. Similarly, latch 46 acts as an interface between I/O controller 26 and the LED bank 30.

In operation, when microprocessor controller 20 determines that the battery is in a safe range for charging rapidly, it sends an enable signal to 20 KHz oscillator 48 through latch 50. This enable signal allows a 20 KHz signal to be output to high rate charger 52. High rate charger 52 will be discussed further with reference to FIG. 6. In this embodiment, microprocessor 20 will allow high rate charging when a nominally 9.2 volt CdS battery has reached 7.2 volts and is still within an allowable temperature range. When the battery reaches 99% of its full charge capacity (9.2 volts), or excessive cell overheating is present, the rapid charge cycle ends.

A primary advantage of the present invention is the ability to bring a battery up to the level necessary (e.g., 7.2 volts for a 9.2 volt Cds battery) to insure sufficient integrity of the battery structure and safe conditions at a moderate "trickle" charge rate. When the battery has reached 99% capacity safely using a truly rapid or high rate charge, a very low rate (different from the trickle charge) is applied. This lowest rate or "tickle" charge is low enough that it does not produce any significant heating effects in the battery, yet keeps the battery at substantially full charge while it remains in the charger. The prior art, using only a two level charger, necessitated a compromise between the trickle and tickle charge. Frequently this compromise was too low to bring a badly discharged battery up to a high enough rate to safely be rapid charged, and yet still high enough to produce significant heating effects in a fully charged battery being merely maintained.

Figure 3:
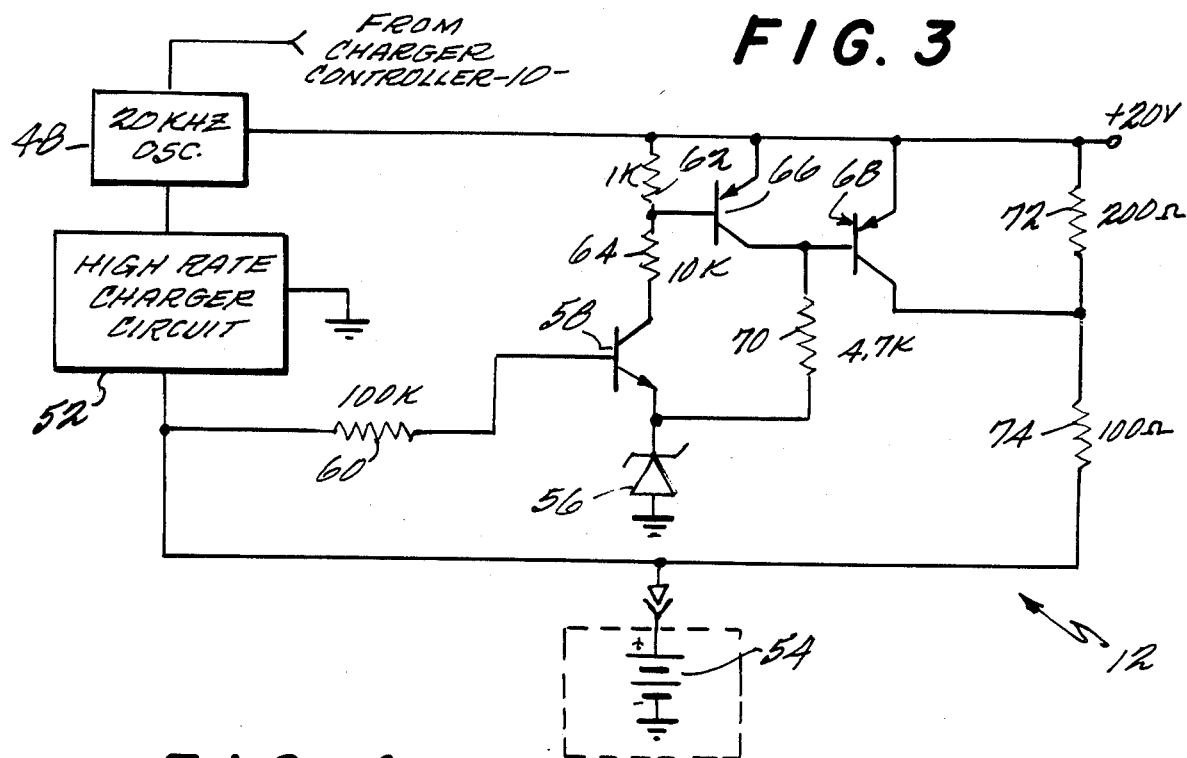
FIG. 3 is a block diagram of an exemplary embodiment of the trickle/tickle charger of the present invention

Charger circuit 12 as shown in FIG. 3 overcomes these problems. 20 KHz oscillator 48 and high rate charger 52 are shown as connected to battery 54 in parallel with charger circuit 12.

In operation, charger circuit 12 uses a voltage reference means, in this case zener diode 56, to determine if the voltage is greater than a predetermined threshold. The predetermined threshold in effect consists of the sum of the voltage across the base-emitter junction of transistor 58 and the voltage across voltage reference 56.

In this embodiment (e.g., for Cadmium sulfate batteries), the voltage from the base of transistor 58 to ground ($V_B$) is approximately 7.25 to 7.8 volts. This voltage range is chosen in this embodiment so that "trickle" charging cannot terminate before rapid charging begins. Non precision (e.g., 10%) components are used, being chosen so that the lowest possible voltage at which switching can occur is greater than the 7.2 V point at which the rapid charger begins. A resistor 60 is connected between the base of transistor 58 and the anode of battery 54. When the battery voltage is less than $V_B$ (7.25–7.8 v), the base-emitter junction of transistor 58 is reverse biased, and thus transistor 58 is off. Transistor 58 being off allows no closed circuit path to ground across resistors 62 and 64, and thus transistor 66 is also off. Transistor 68, however receives forward bias through the ground path formed by resistor 70 to ground through voltage reference 56, and thus is turned on. Transistor 68 thus effectively short circuits across resistor 72, leaving only resistor 74 (in this embodiment, 100 ohms) in series with the charging voltage to the battery.

However, when the anode of battery 54 reaches $V_B$, (7.25–7.8 in this embodiment), the voltage at the base of transistor 58 is sufficient to forward bias the base emitter junction, and thus transistor 58 turns on. A voltage divider network is then formed by resistors 62 and 64, to turn transistor 66 on. With transistor 66 on, there is no forward base-emitter bias across transistor 68 and it is thus turned off. The effect of this is that resistor 72 is placed in series with resistor 74 (in this embodiment, total effective resistance of 300 ohms) thus further limiting the charge current passed to battery 54.

Summarizing the operation described above, when battery voltage is less than 7.25–7.8 volts or $V_B$, a medium rate "trickle" charge is applied to the battery. When the battery voltage exceeds $V_B$ a very low "tickle" charge is applied to the battery which is a much lesser charge rate than the trickle charge. In this embodiment, the chosen trickle charge is 150 milliamps and the chosen tickle charge is 35 milliamps (e.g., for 9.2 volt CdS batteries).

However, in parallel with this circuit is a high rate charger circuit 52, as controlled by charge controller 10. When battery 54 reaches 7.2 volts (as measured by a precision voltage reference) assuming that no temperature or other faults have been detected by microprocessor 20, high rate charger circuit 52 is initiated. Then, when the trickle charge plus the rapid charge has brought the battery up to 7.25–7.8 ($V_B$), the trickle charge is terminated. In this embodiment, the high rate charge is approximately 1 ampere. This high rate charge is then applied to the battery in parallel with the tickle charge of 35 milliamps from the circuitry as described above.

Figure 4:
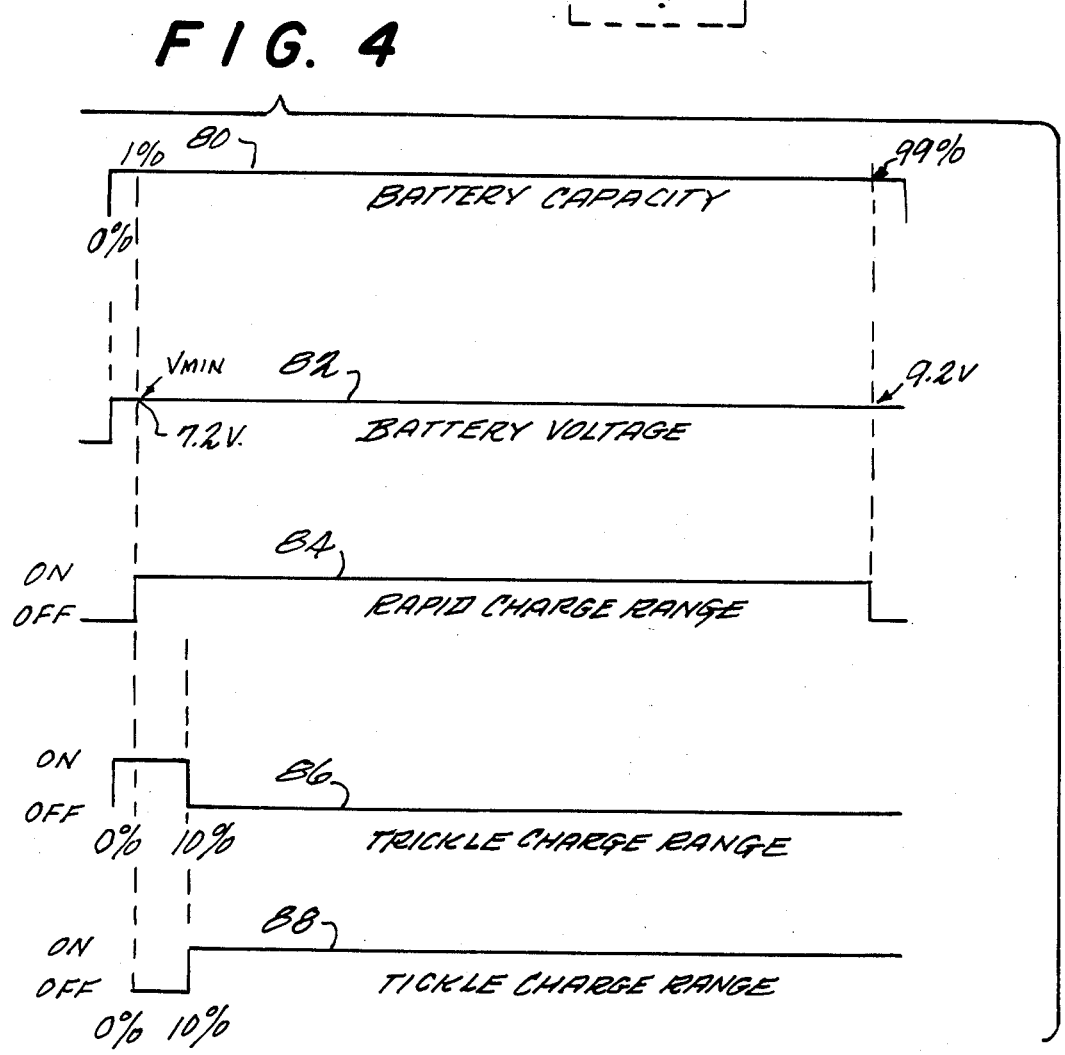
FIG. 4 illustrates charging ranges used by the battery charger of FIG. 3.

The effect of this combination is shown in FIG. 4. Curve 80 illustrates the battery capacity from 0 to 100% and represents the abscissa for the lower three graphs. Curve 82 corresponds to curve 80 but in terms of voltage rather than in percentage of capacity. $V_{min}$ on the left side of curve 82 represents the minimum voltage to which a battery can be discharged. Below this minimum voltage no current will be produced from the battery. Curve 84 shows the region of battery capacity in which the rapid charger is employed. This region extends from 1% of battery capacity to 99% of battery capacity and corresponds approximately to 7.2 volts to 9.2 volts in the present exemplary embodiment (e.g., for a typical 9.2 volt Cds battery). Curve 86 shows the region in which a trickle charge is used. The trickle charge is used to bring the battery up to approximately 1% of its maximum capacity (shown on curve 86 as 10% for emphasis). The rapid charger will thus be on for a short time before the trickle charge is turned off. The purpose of the trickle charge is to bring the battery up to rapid charge range and ensure that there are no bad cells within the battery before rapid charging is attempted.

At 7.2 volts in this embodiment (which is approximately 2-10% of battery capacity) there is a sufficient likelihood of no dead cells (e.g., in a Cds battery) so that the battery can be rapid charged. However, in order to ensure that no race condition persists between the trickle charger turning off and rapid charger coming on, the trickle charger is designed to turn off some determinable amount of time afterwards. Thus, while rapid charging begins at 7.2 V, the trickle charge cannot be terminated before 7.25 V. It should be noted that once rapid charge begins, the battery capacity will increase rapidly and thus from 1% to 10% of battery capacity will take a relatively short time. In this embodiment 1 to 10% of battery capacity should take no more than 10 minutes.

As shown in curve 88, when the trickle charge terminates, the tickle charge begins at exactly the same time. This tickle charge has two advantages. One advantage is that microprocessor 20 checks battery 54 every one to two seconds to test its voltage. At this time, microprocessor 20 turns off rapid charger 52 so as to get a more accurate reading of the battery voltage. When rapid charger 52 is turned off for the 10 millisecond window, the battery voltage is sensed with only a tickle charge of approximately 35 milliamps across it. This has an advantage over typical prior art arrangements where a compromise rate of approximately 100 milliamps was used. Using a 100 milliamp charge current across the battery during voltage tests would tend to artificially stretch the battery voltage up, and would tend to shut off high rate charger 52 prematurely. In the present embodiment, during a majority of the rapid charging period, the tickle charge of only 35 milliamps is all that will be stretching the battery voltage up during the time window in which the rapid charger is turned off. Also, the period during which the trickle charge is in parallel with the rapid charge is the lowest capacity of the battery. Thus, the danger of stretching the battery voltage up enough to "fool" the high rate charger into turning off is minimized as the battery voltage will only be a maximum of 10% of full capacity.

A second exemplary embodiment of the charger circuit 12 is shown in FIG. 5. This second embodiment 90 uses conventional integrated circuits to perform the same function as performed by the first embodiment 12. Referring to FIG. 5, a voltage reference means, in this case voltage regulator 92, is used instead of zener diode 56 as in first embodiment 12. The anode of battery 54 is connected to the negative input of voltage comparator 94, and the output of the three terminal voltage regulator 92 is connected to the positive input of voltage comparator 94. Thus, when the battery voltage exceeds the reference voltage, which in this embodiment chosen is to be 7.3 volts, the output of voltage comparator 94 will toggle to the opposite state. The output of voltage comparator 94 is connected to an analog switch IC 96. When the voltage of the battery 54 is less than the voltage of the reference 92, the output from voltage comparator 94 is high, thus turning on analog switch 96 and shorting across resistor 98. This has the effect of leaving only resistor 100 in series with the charging voltage to battery 54. When the voltage on battery 54 exceeds the voltage on reference 92, the output of voltage comparator 94 goes low, thus turning off analog switch 90 and leaving the series resistance of the combination of resistors 98 and 100. High rate charger 52 is in parallel with this second embodiment as in the first embodiment, and it can be seen from the above discussion that this embodiment performs analogously to the first embodiment.

Figure 6:
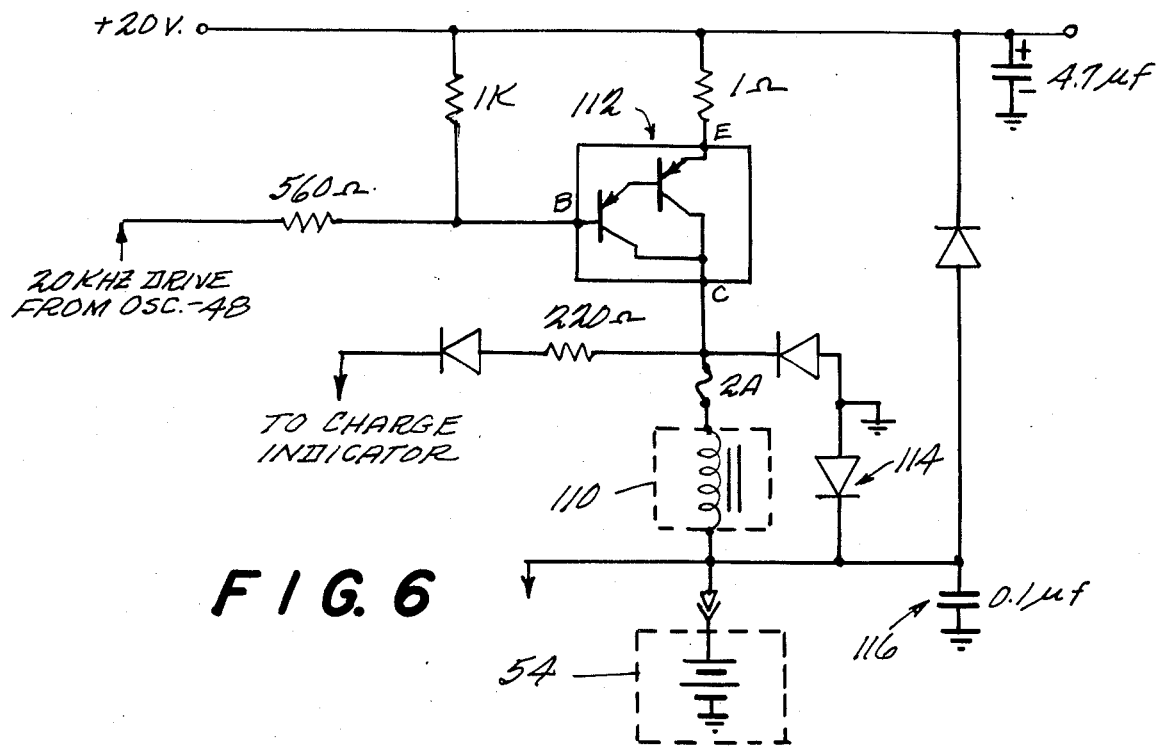
FIG. 6 is a schematic representation of the switch mode charger which may be is used as part of the rapid charging circuit in the present exemplary embodiments.

The high rate charger circuit 52 is shown schematically in FIG. 6 (see U.S. Pat. No. 3,835,368 for a more detailed description). This high rate charger is a high efficiency switch mode power supply which using a 20 KHz drive to switch across choke 110 using a conventional circuit known generically as a charge pump. This 20 KHz drive from 20 KHz oscillator 48 turns on and off a Darlington transistor pair 112. This has the effect of causing a 20 KHz signal to be switched across choke 110. When transistor 112 is on, current from the 20 volt supply increases through choke 110. When transistor 112 is off, this stored energy in choke 110 flows as current to battery 54 through diode 114. Also during this time capacitor 116 is charged. When transistor 112 turns back on, choke 110 begins charging with current again, but the previously stored charge on capacitor 116 will continue to supply charge current to battery 54.

A similar system to this switch mode charger is described in U.S. Pat. No. 3,835,368 to Williams which is expressly incorporated herein by reference.

Figure 7:
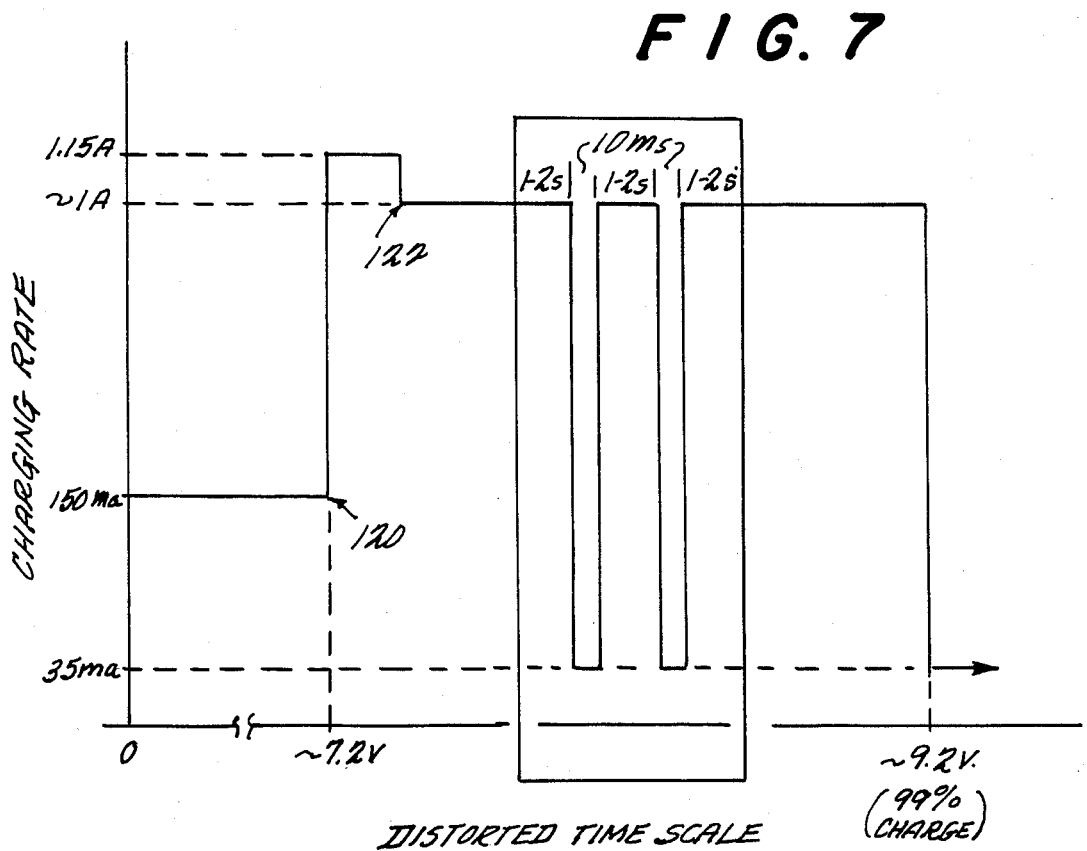
FIG. 7 is a diagram of applied charge rate plotted as a function of stored charge in a battery (e.g., open circuit voltage)

In summary, the operation of the exemplary embodiment is described at FIG. 7 showing the total time history of a typical battery being charged. (It should be noted that FIG. 7 is not drawn to scale.) From 0 to approximately 7.2 volts, the trickle charge of 150 milliamps is applied to the battery to bring it up to the point where it becomes safe to rapid charge the battery. At the point labeled 120 in FIG. 7, rapid charging begins. At this point, the trickle charge is still operating so that the total charging rate of the battery is approximately 1.15 amps, equalling the high charge rate plus the trickle charge rate. At point 122 (approximately 7.25-7.8 volts) the trickle/tickle charge circuit as described with reference to either FIG. 3 or FIG. 6 changes from trickle to tickle charge, and the effective charging current is lowered thereby. This rate of approximately 1 amp will persist until the battery reaches approximately 99% capacity. During this time, every 1 to 2 seconds the rapid charge will be terminated for approximately a 10 millisecond window during which time the voltage on the battery is sensed. When the voltage is sensed as being a voltage which corresponds to approximately 99% of battery capacity, the rapid charging is terminated. At this point the charge being applied to the battery is the tickle charge of approximately 35 milliamps.

Figure 8:
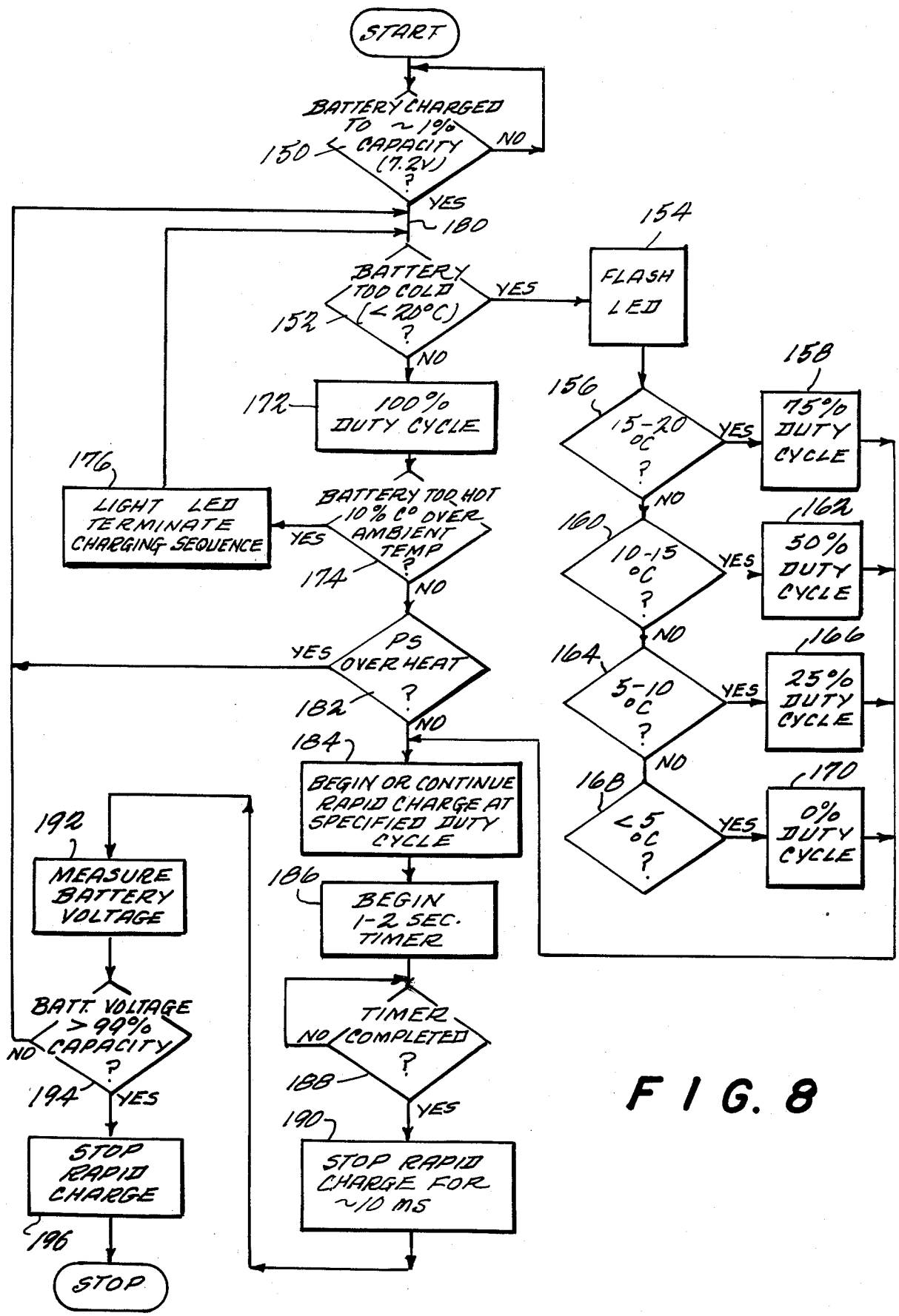
FIG. 8 is a flow chart showing the software processes used by the charger controller to control the rapid rate charger.

A typical operation of microprocessor 20 in operating the rapid charged portion of battery charger as described in the exemplary embodiment is depicted in flow chart form in FIG. 8. In operation, at step 150, microprocessor 120 determines that the trickle charger has brought the battery up to approximately 1% capacity, which in this embodiment (e.g., a CdS battery) is 7.2 volts. When the battery has been brought up to this capacity, at step 152 the temperature of the battery is tested. If the temperature of the battery is less than 20° C., the LED in LED bank 30 is flashed as at step 154 to indicate that the battery is below optimal temperature for charging. At this point the actual temperature range of the battery is ascertained and a duty cycle assigned to the battery depending on this temperature range. Battery temperature being from 15° to 20° C. is assigned a duty cycle of 75% at steps 156 and 158. Battery temperature between 10° and 15° C. is assigned a 50% duty cycle at steps 160 and 162. If the battery is between 5° and 10° C. at step 164, a 25% duty cycle is assigned at step 166. If the battery is less than 5° C. at step 168, a 0% duty cycle is assigned at step 170, affectively allowing no charge on the battery until the temperature of the battery is raised. If the battery is above 20° C. at step 152, a 100% duty cycle is assigned at step 172. At this point the battery is tested for overtemperature at step 174. The present embodiment defines an overtemperature as occurring when the battery is 10° C. over ambient temperature. If this occurs, the LED in LED bank 30 corresponding to the heated battery is caused to light at step 176, and the program flow returns to step 180 so that battery temperature will be continually tested until it is within safe range for rapid charge. If the battery was found to be in safe temperature limits at step 174, the temperature of the power supply is then tested at step 182. If the power supply is too hot the flow will also return to step 180 until proper temperature is attained. If the power supply temperature is within acceptable temperature range, the rapid charging is begun at step 184.

During the rapid charge sequence, the battery voltage is continually tested to insure that the battery is not overcharged. In this embodiment, every 1 to 2 seconds the battery voltage is tested. At step 186 a 1 to 2 second timer is begun. Step 188 tests for timer completion, and stops the rapid charging sequence for 10 milliseconds at step 190. During this 10 millisecond period ("window") the battery voltage is tested at step 192. If the battery voltage is not greater than 99% (e.g., approximately 9.2 V in a CdS battery) of its capacity at step 194, program flow returns to step 180 where battery temperature and power supply temperature are tested before the 1 to 2 second timer being re-initated at step 186. If the battery voltage is greater than 99% capacity at step 194, the rapid charge sequence is terminated at step 196. At this point the tickle charge being generated by the trickle/-tickle charger will insure that the battery remains at substantially full charge.

Although only a few exemplary embodiments of this invention have been described in detail above, those skilled in the art will readily appreciate that many variations and modifications may be made in these embodiments while yet retaining many of the novel features and advantages of this invention. Accordingly, all such modifications are intended to be included within the scope of this invention as defined in the following claims.

What is claimed is:

1. A three level battery charging circuit comprising:
    a dual rate charging circuit connectable across the terminals of a battery to be charged and including an automatic switch means for automatically switching from a first charge rate to a second lower charge rate in response to a sensed battery voltage in excess of a first predetermined threshold voltage;
    a further charging circuit providing charging current at a third rate higher than said first rate and connected in parallel with said dual rate charging circuit; and
    control means connected to control said further charging circuit so as to switch it to active condition in response to a sensed battery voltage in excess of a second predetermined threshold voltage which is less than said first threshold;
    whereby, for a fully discharged battery, the following sequence of charging rates is provided: (a) said first rate, (b) the combination of said first rate and said third rate, (c) the combination of said second rate and said third rate, and (d) said second rate.

2. A three level battery charging circuit as in claim 1 wherein said dual rate charging circuit comprises:
    a voltage reference connected to a voltage comparator and switch circuit including first and second resistances connected in series with the battery to be charged and shorting switch connected in parallel with at least one of said resistances.

3. A three level charging circuit as in claim 2 wherein said control means includes means for automatically turning said further charging circuit on and off in response to sensed battery voltage and temperature conditions so that said third charge rate is applied to the battery only under predetermined conditions of temperature and sensed battery voltage.

4. A three level battery charging circuit comprising:
    first means for applying continuous battery charging at a first rate for bringing a battery from a fully discharged state to a predetermined level for receiving a higher charge rate;
    second means for applying battery charge at a second rate higher than said first rate for rapid battery recharge; and
    third means for applying continuous battery charge at a third rate lower than said first rate to sustain full charge on the battery once a predetermined battery voltage is reached
    said first, second and third means being interconnected and inter-related to produce the following sequence of charging rates for a fully discharged battery: (a) said first rate, (b) said second rate, and (c) said third rate.

5. A circuit for charging a battery at differing combinations of three charging rates: (a) a first charging rate for bringing battery from discharged state to a predetermined level for high rate charge; (b) a second rate charge higher than said first rate for rapid battery recharge, and (c) a third charging rate lower than said first rate to sustain full charge on the battery once charging to a predetermined battery voltage is reached, said circuit comprising:
    rate control means for (1) determining when said battery is within predetermined limits for said second rate changing, and (2) applying said second rate charge to said battery while said battery is within said predetermined limits;
    voltage comparator means for comparing said battery voltage with a reference voltage;
    source means for applying a continuous charging voltage and current to a battery;
    first and second resistance means for series limiting the continuous charging current applied by said source means;
    said first and second resistance means being connected in series with each other and in series with the battery and said source means to provide said first charging rate when at least one of asid resistance means is bypassed and otherwise to provide said third charging rate; and
    switching means for bypassing at least one of said first and second resistance means when said voltage comparator means detects said battery voltage increase beyond said reference voltage
    whereby, for a fully discharged battery, the following sequence of charging rates is provided: (a) said first rate, (b) the combination of said first and second rates, (c) the combination of said second and third rates, and (d) said third rate.

6. A circuit as in claim 5 wherein said voltage comparator means comprises a transistor with a zener diode connected between said transistor emitter and ground, said transistor turning on when the voltage on the base of said transistor is greater than the base emitter voltage of said transistor plus the voltage across said zener diode.

7. A circuit as in claim 6 wherein said switching means comprises a transistor.

8. A battery charger system for charging each of a plurality of batteries at different combinations of three charging rates comprising:
   measuring means for measuring the voltage of each of said batteries and the temperature of each of said batteries;
   control means for determining whether the voltage of each of said batteries and the temperature of each of said batteries is within a predetermined region for applying a predetermined rate charge thereto;
   first charging means fo applying said predetermined current charge rate to each of asid batteries, said first charging means being externally controllable in response to said control means, for turning on and off said first charging means;
   second charging means for applying a further rate of charge to each of said batteries which is less than said predetermined current charge rate;
   first resistance means for initially limiting the charge from said further charging means to a first rate;
   second resistance means for subsequently limiting the charge from said further charging means to a second rate which is lower than said first rate;
   comparator means for detecting the voltage on each of said batteries and comparing it with a known reference voltage; and
   switching means for switching between said first and said second resistance means in response to the signal from said voltage comparator means
   whereby, for a fully discharged battery, the following sequence of charging rates is provided: (a) said first rate, (b) the combination of said first rate and said predetermined rate (c) the combination of said second rate and said predetermined rate, and (d) said second rate.

9. A high rate charging system for a battery comprising:
   means for monitoring the temperature of said battery;
   means for monitoring the voltage of said battery;
   first charging means for supplying a predetermined rate charge to said battery;
   control means for:
   (1) determining if said battery is in a predetermined condition for charging at said predetermined rate based on the temperature and voltage readings obtained from said means for monitoring temperature and voltage;
   (2) initiating and terminating the operation of said first charging means based on said temperature and voltage readings according to a predetermined control sequence; and
   (3) suspending said predetermined charging operation temporarily and monitoring said voltage reading only during said suspension; and
   bi-level rate further charging means for charging said battery even when said first charging means is not operating: (a) initially at a first rate and (b) subsequently at a second rate which is lower than said first rate so as to maintain full battery charge
   the following sequence of charging rates being provided for a fully discharged battery: (a) said first rate, (b) the combination of said first rate and said predetermined rate, (c) the combination of said second rate and said predetermined rate, and (d) said second rate.

10. A system as in claim 9 wherein said control means further comprises (4) means for operating an indicator based on the temperature of said battery, said indicator being in one state when said battery is overheating, and a second state when said battery is too cold.

11. A system as in claim 10 wherein said one state is a steady state, and said second state is a "flashing" state.

12. A method for rapidly charging a rechargeable battery, comprising the steps of:
   firstly charging said battery at a first rate which is sufficient to raise a fully discharged battery to a first predetermined level;
   testing said battery during said first charging step to ensure that predetermined parameters are within predetermined limits;
   secondly charging said battery at a second rate which is substantially higher than said first rate;
   recurrently testing the voltage on said battery during said second charging step and, terminating said second charge step when said battery has reached substantially full charge; and
   thirdly charging said battery thereafter at a third rate substantially lower than said first rate to maintain said battery at its maximum charge while minimizing adverse heating effects on said battery.

13. A method as in claim 12 wherein said recurrently testing step comprises the steps of:
   (1) sensing the temperature of said battery and suppressing said second charging step if the temperature of said battery is a predetermined amount in excess of ambient temperature;
   (2) applying said second rapid rate charge at a predetermined duty cycle if the temperature of said battery is a predetermined amount less than ambient temperature; and
   (3) beginning said second rapid rate charge if said battery is within safe temperature limits.

14. A method as in claim 13 wherein said recurrently testing step further comprises the steps of:
   terminating said charging for a short predetermined time within a longer predetermined time period; and
   testing the terminal voltage at said battery during this short predetermined time.

* * * * *